Patented Jan. 30, 1945

2,368,515

UNITED STATES PATENT OFFICE 2,368,515

ORGANIC COMPOUNDS CONTAINING BOTH SULPHUR AND NITROGEN

Edward S. Blake, Nitro, W. Va., assignor to Monsanto Chemical Company, St. Louis, Mo., a corporation of Delaware No Drawing. Application November 7, 1940, Serial No. 364,753

9 Claims. (Cl. 260—247)

The present invention relates to the preparation of organic compounds containing both sulphur and nitrogen.

In accordance with this invention it has been found that organic sulphides in which a sulphur atom is linked directly to a nitrogen atom form additive products with carbon bisulphide or carbon oxysulphide. The products so produced are believed to be derivatives of carbamic acids and more particularly to contain the group

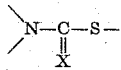

where X is oxygen or sulphur. Since many higher sulphides are of varying and uncertain composition it has not been possible to establish the correctness of this view in all cases. However it seems most probable that the reaction proceeds as follows:

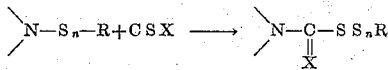

where X represents oxygen or sulphur, $n$ represents an integer and R an organic radical. In this connection it is evident that where R is a radical in which nitrogen is linked to sulphur there is opportunity for a second molecule of CSX to react and as a matter of fact this has been found to take place. However, the presence of one sulphur to nitrogen linkage is sufficient to permit the above type reaction and R may be an organic radical in which carbon is linked to sulphur. Thus, unsymmetrical as well as symmetrical sulphides may be reacted with $CS_2$ or COS.

Without limiting the invention it may be stated that sulphides of strong secondary amines react with ease to produce products of high stability possessing valuable properties for accelerating the vulcanization of rubber. A particularly useful class of amines for this purpose are secondary amines in which the nitrogen atom is either part of a saturated heterocyclic ring or is linked to a saturated cyclic group as for example N alkyl cyclohexylamines, morpholine, piperidine and the like. Thiuram sulphides are produced by action of carbon bisulphide on the symmetrical sulphides of these amines. Accordingly the present invention provides a novel process for the preparation of thiuram sulphides, many of which are widely used for accelerating the vulcanization of rubber. A particular object of the invention is to provide a novel process for the preparation of thiuram polysulphides. Other and further objects will be hereinafter shown.

Typical examples of sulphides which may be employed in the present process comprise morpholine mono sulphide, morpholine disulphide, piperidine mono sulphide, piperidine disulphide, piperidine phenyl sulphide, piperidine o-nitro phenyl sulphide, piperidine p-nitro phenyl sulphide, piperidine benzothiazyl sulphide, piperidine chlor benzothiazyl sulphide, piperidine naphthothiazyl sulphide, piperidine methyl thiazyl sulphide, methyl cyclohexylamine monosulphide, methyl cyclohexylamine disulphide, ethyl cyclohexylamine disulphide, ethyl cyclohexylamine phenyl sulphide, ethyl cyclohexylamine benzothiazyl sulphide, ethyl cyclohexylamine 4 phenyl benzothiazyl sulphide, propyl cyclohexylamine methyl benzothiazyl sulphide, butyl cyclohexylamine mono sulphide, amyl cyclohexylamine disulphide, amyl cyclohexylamine benzothiazyl sulphide, dimethyl amine mono sulphide, diethyl amine disulphide and equivalents and analogues thereof.

The following are specific embodiments of the invention and are to be understood as illustrative of the invention but in nowise limitative thereof.

Example I

Into a suitable reaction vessel fitted with a stirrer and reflux condenser there was charged 27 parts by weight of piperidine disulphide (substantially 0.116 molecular proportions) and 20 parts by weight of carbon disulphide (substantially 0.26 molecular proportions). These reactants were brought into solution by the addition of a suitable inert solvent as for example petroleum ether and the charge stirred until the reaction was complete, about four hours being sufficient. The oil which separated initially soon solidified and was filtered off and combined with a further portion of material obtained after removal of the solvent. The product after one recrystallization from benzene melted at 120–121° C. and was believed to be a di(cyclopentamethylene) thiuram polysulphide on which basis the yield was 92%.

Example II

Where convenient or desirable the amine may be reacted with a sulphur halide to form an amine sulphide and the latter reacted directly with $CS_2$ or COS thus eliminating the step of isolating the amine sulphide. For example 72 parts by weight of 95% piperidine dissolved in a suitable solvent as for example petroleum ether was treated with 27 parts by weight of sulphur chloride, $S_2Cl_2$ at 10° C. or below. Piperidine hydrochloride formed as a by-product in the reaction was demoved, preferably by filtration and the clear filtrate combined with 40 parts by weight of carbon disulphide substantially as described in the foregoing example. The overall yield was 89% based on the sulphur chloride.

*Example III*

COS generated from a mixture of ammonium thiocyanate and dilute mineral acid was passed into a solution of 23.2 parts by weight of piperidine disulphide in a suitable organic solvent such as petroleum ether. When a precipitate no longer separated the reaction was regarded as complete. The flow of COS was then interrupted and the precipitated product removed by filtration and dried. The product believed to be di(cyclopentamethylene carbamyl) polysulphide melted at 127–129° C. after one recrystallization from benzene.

*Example IV*

To 116 parts by weight of 98% methyl cyclohexylamine dissolved in an inert organic solvent there was slowly added at 10° C. or below and with efficient stirring, 33.75 parts by weight of sulphur chloride diluted with an inert solvent. The methyl cyclohexylamine hydrochloride was filtered off and to the clear filtrate of methyl cyclohexylamine disulphide there was added 50 parts by weight of carbon bisulphide. The resulting mixture was stirred for about 15 hours or until reaction was complete, then the solvent removed and the residue taken up in a mixture of ether and benzene and washed with water. After removal of the solvent a good yield of a resinous product believed to be dimethyl dicyclohexyl thiuram polysulphide was obtained.

*Example V*

Carbon oxysulphide was passed into a solution of 28.8 parts by weight of N-methyl cyclohexylamine disulphide dissolved in an inert organic solvent until the gas was no longer absorbed. A small amount of sulphur which had precipitated was filtered off after which the solvent was removed leaving as a residue a viscous amber oil. Since the amount of gas absorbed corresponded to a mol to mol reaction the product was believed to be methyl cyclohexyl carbamyl, methyl cyclohexylamine trisulphide.

*Example VI*

Into a suitable reaction vessel there was charged substantially 30.6 parts by weight of morpholine mono sulphide and substantially 750 parts by weight of carbon bisulphide. The charge was heated at refluxing temperature for about 18 hours, then most of the carbon bisulphide removed and the precipitated product filtered therefrom. Substantially 46 parts by weight of a product melting at 149–150° was obtained which product was found to contain 43.9% sulphur and 7.78% nitrogen. The values calculated for di-(morpholyl N thio carbamyl) trisulphide are sulphur 44.9% and nitrogen 7.86%.

The identical product may be obtained from the reaction of morpholine disulphide and carbon bisulphide, one atom of sulphur being split out in the reaction.

*Example VII*

23.6 parts by weight of morpholine disulphide were dissolved in a suitable organic solvent as for example benzene and COS passed into the solution so prepared until a precipitate no longer separated, after which the precipitated product was filtered off, washed with a suitable solvent such as benzene and dried. 29.5 parts by weight of a white crystalline product melting at 179–181° C. were obtained. Analysis for sulphur and nitrogen indicated that the product was probably a trisulphide of the probable formula ·

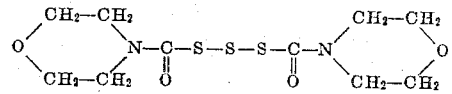

*Example VIII*

Substantially 25 parts by weight of piperidine benzothiazyl sulphide and substantially 25 parts by weight of carbon bisulphide were dissolved in a suitable solvent as for example 200 parts by weight of acetone, and charged into a suitable reaction vessel. The solution was stirred for several hours and allowed to stand for one day after which it was filtered from a precipitate identified as di benzothiazyl disulphide (formed as the result of a side reaction), the solvent removed and the product washed with ether. The foregoing procedure resulted in a light colored crystalline product melting at 96–98° C. which after one recrystallization from petroleum ether was raised to 98–102° C. Analysis for sulphur and nitrogen gave the following results as compared to those calculated for cyclopentamethylene thiocarbamyl benzothiazyl disulphide.

|  | Sulphur | Nitrogen |
| --- | --- | --- |
| Found | 39.5 | 8.62 |
| Calculated | 39.3 | 8.58 |

The principal reaction between carbon bisulphide and cyclopentamethylene amino thio benzothiazole therefore proceeds as follows:

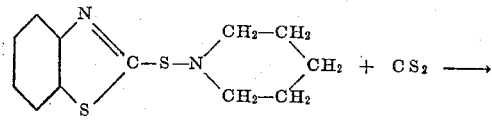

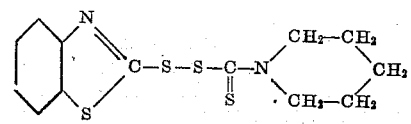

0.50 part by weight of this product compounded into a rubber stock comprising pale crepe rubber 100 parts, zinc oxide 10 parts, sulphur 3 parts, and stearic acid 0.50 part provided a stock which cured in 60 minutes at the temperature of five pounds steam pressure per square inch and possessed a modulus of elasticity of 1075 lbs./in.$^2$ at 500% elongation and an ultimate tensile of 4830 lbs./in.$^2$.

The present invention is limited solely by the claims attached hereto as part of the present specification.

What is claimed is:

1. The method of making derivatives of carbamic acids by disrupting a nitrogen to sulphur bond of an organic sulphide and introducing SC=X between the nitrogen and sulphur which consists of treating a sulphide of the structure

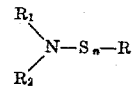

with SC=X where R represents an organic radical, $R_1$ and $R_2$ are selected from a group consisting of alkyl groups, alicyclic groups and groups joined by a methylene chain to form a saturated heterocyclic ring, X is selected from a group consisting of oxygen and sulphur and $n$ is an integer less than three.

2. The method of making derivatives of carbamic acids by disrupting a nitrogen to sulphur bond of an organic sulphide and introducing SC=X between the nitrogen and sulphur which consists of treating a sulphide of the structure

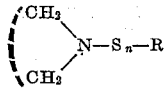

with SC=X, X is selected from a group consisting of oxygen and sulphur, $n$ is an integer less than three, the group

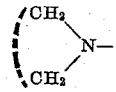

is the residue of a strong heterocyclic amine and R is an organic radical.

3. The method of making sulphides of carbamic acids by disrupting the two nitrogen to sulphur bonds of an amine sulphide and introducing SC=X between the nitrogen and sulphur which consists of treating a sulphide of the structure

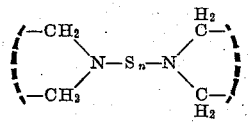

with SC=X, X being selected from a group consisting of oxygen and sulphur and $n$ is an integer less than three and the group

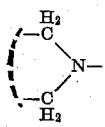

is the residue of a strong heterocyclic amine.

4. The method of making thiuram sulphides which consists of treating a sulphide of a strong secondary amine in which sulphur is directly linked to nitrogen with carbon bisulphide.

5. The method of making thiuram sulphides which consists of treating a sulphide of a strong heterocyclic secondary amine in which sulphur is directly linked to nitrogen with carbon bisulphide.

6. The method of making thiuram sulphides which consists of treating a sulphide possessing the structure

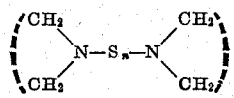

with carbon bisulphide, the group

is the residue of a strong heterocyclic amine and $n$ being an integer less than three, both the nitrogen to sulphur bonds being disrupted and each replaced by a nitrogen bond to the carbon atom of different carbon bisulphide molecules.

7. The method of making di(cyclopentamethylene) thiuram polysulphide which consists of treating piperidine disulphide with carbon disulphide.

8. The method of making di(morpholyl N-thio carbamyl) polysulphide which consists of treating morpholine disulphide with carbon disulphide.

9. The method of making carbamyl sulphides which consists of treating an amine sulphide having at least one sulphur atom linked directly to an amino nitrogen atom with SC=X where X is selected from a group consisting of oxygen and sulphur, the said nitrogen to sulphur bond being disrupted and replaced by a nitrogen bond to the carbon of the CS=X.

EDWARD S. BLAKE.